(12) United States Patent
Lim et al.

(10) Patent No.: US 7,907,682 B2
(45) Date of Patent: Mar. 15, 2011

(54) APPARATUS AND METHOD FOR INITIAL FRACTIONAL FREQUENCY OFFSET ESTIMATION IN A BROADBAND WIRELESS ACCESS COMMUNICATION SYSTEM

(75) Inventors: In-Chun Lim, Anyang-si (KR);
Yong-Sun Hwang, Suwon-si (KR);
Bong-Gee Song, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 12/030,370

(22) Filed: Feb. 13, 2008

(65) Prior Publication Data

US 2008/0192874 A1    Aug. 14, 2008

(30) Foreign Application Priority Data

Feb. 13, 2007  (KR) .................. 10-2007-0014655

(51) Int. Cl.
*H04L 27/00* (2006.01)
(52) U.S. Cl. ....................................................... 375/316
(58) Field of Classification Search ................. 375/316, 375/324, 326, 328, 338, 340, 342, 344, 346, 375/359
See application file for complete search history.

(56) References Cited

U.S. PATENT DOCUMENTS

| | | | |
|---|---|---|---|
| 6,628,707 B2 * | 9/2003 | Rafie et al. | 375/233 |
| 7,613,104 B2 * | 11/2009 | Bhatt et al. | 370/208 |
| 7,738,589 B2 * | 6/2010 | Kim et al. | 375/295 |

* cited by examiner

*Primary Examiner* — Sam K Ahn
(74) *Attorney, Agent, or Firm* — Jefferson IP Law, LLP (57) ABSTRACT

An apparatus and method for initial fractional frequency offset estimation are provided. In an apparatus for estimating an initial fractional frequency offset in a Broadband Wireless Access (BWA) communication system, the apparatus includes a sample power calculator for calculating a power of input sample data and for calculating an average power of a specific symbol, a power threshold comparator for comparing the sample data power in magnitude with the average power of the specific symbol and for outputting one of an accumulation ON and OFF signal, a first buffer for correlating a last data of the sample data with the sample data and for storing sample data corresponding to a preset number of correlation results, a second buffer for storing sample data corresponding to correlation results other than the sample data stored in the first buffer; and an accumulator for allowing accumulation of sample data stored in the second buffer if the power threshold comparator outputs the accumulation ON signal.

15 Claims, 7 Drawing Sheets

CONVENTIONAL ART

FIG.6

CONVENTIONAL ART

APPARATUS AND METHOD FOR INITIAL FRACTIONAL FREQUENCY OFFSET ESTIMATION IN A BROADBAND WIRELESS ACCESS COMMUNICATION SYSTEM

PRIORITY

This application claims the benefit under 35 U.S.C. §119(a) of a Korean patent application filed in the Korean Intellectual Property Office on Feb. 13, 2007 and assigned Serial No. 2007-14655, the entire disclosure of which is hereby incorporated by reference.

BACKGROUND OF THE INVENTION

1. Field of the Invention

The present invention relates to initial fractional frequency offset estimation. More particularly, the present invention relates to an apparatus and method, in which a frequency offset is accurately estimated by controlling an accumulation of symbol power according to a presence or absence of DownLink (DL) symbol data, in a Broadband Wireless Access (BWA) system employing beam forming.

2. Description of the Related Art

An initial fractional frequency offset estimation process is used to increase the accuracy when estimating an initial fraction frequency offset by using an auto-correlation based on a repetition structure in which a Cyclic Prefix (CP) and a valid data sample are repeated in a DownLink (DL) data symbol.

Figure 1:
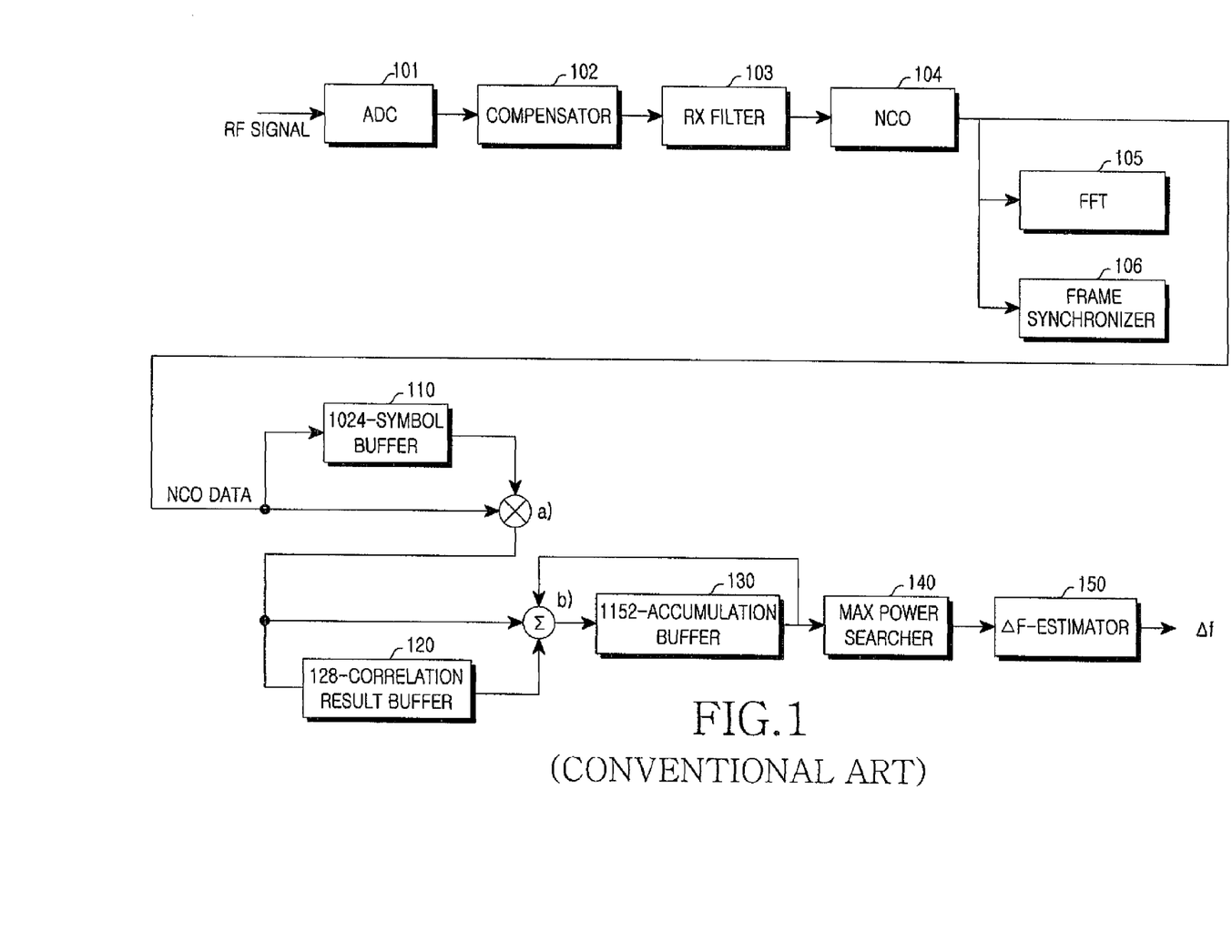
FIG. 1 is a block diagram illustrating a conventional apparatus for estimating an initial fractional frequency offset.

FIG. 1 is a block diagram illustrating a conventional apparatus for estimating an initial fractional frequency offset.

In FIG. 1, one symbol is assumed to include 1152 samples among which 128 samples are Cyclic Prefixes (CP).

An Analog to Digital Converter (ADC) 101 converts an analog signal received from a Radio Frequency (RF) unit into a digital signal. A compensator 102 compensates for a Direct Current (DC) offset and an In-phase and Quadrature (I/Q) balance error which are generated in the RF unit. A Receive (RX) filter 103 performs two fold down-sampling on an input signal and then performs a low pass filtering that is required for the down-sampling. A Numerically Controlled Oscillator (NCO) 104 corrects a signal phase by receiving estimation values obtained from frequency error estimators. A Fast Fourier Transform (FFT) 105 transforms a time-domain signal into a frequency domain signal. A frame synchronizer 106 obtains initial frame timing and frequency synchronization.

A 1024-symbol buffer 110 stores 1024 input data samples included in the input signal. A 128-correlation result buffer 120 stores 128 results obtained by correlating the 1024 data samples of the 1024-symbol buffer 110 with the input data samples.

For all 1152 samples, a 1152-accumulation buffer 130 stores accumulation results by accumulating a new correlation value while not accumulating the 128 data samples of the 128-correlation result buffer 120.

When the accumulation of the 1152-accumulation buffer 130 finishes, a max power searcher 140 finds a location of a sample having the greatest value among the 1152 accumulated correlation values.

A Δf-estimator 150 finds a fractional frequency offset by using an accumulated correlation value of the sample having the maximum power.

When using the conventional technique of FIG. 1, correlation values are accumulated for each DL symbol period, and the accumulation result is used to estimate a frequency offset.

The initial fractional frequency offset estimation process is performed before synchronization is obtained. That is, the process is performed before network entry is completed through a Base Station (BS), and thus a user terminal cannot obtain information on a frame the resulted from DL-MAP data decoding. Therefore, the presence or absence of DL symbol data cannot be known by using beam forming information.

Figure 5:
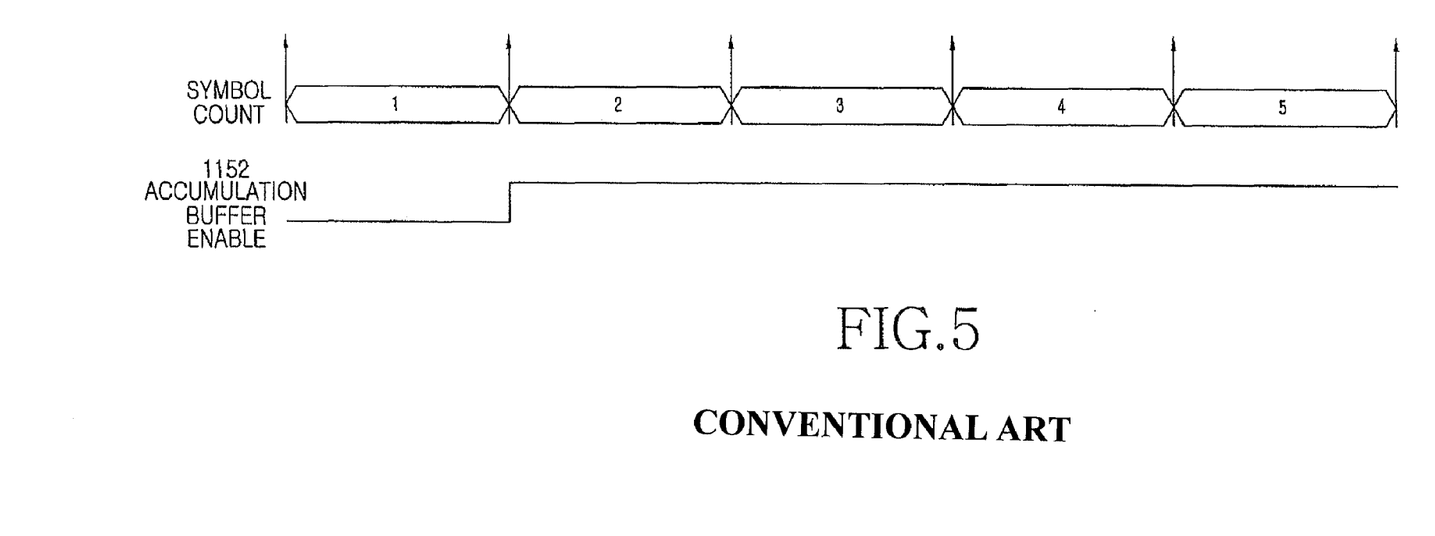
FIG. 5 is a timing diagram of an initial fractional frequency offset estimation in a symbol unit.

As shown in FIG. 5, data is continuously accumulated in the 1152-accumulation buffer 130. Thus, when beam forming is performed for another user terminal, and there are symbols not having data, invalid correlation values are accumulated. The accumulation of invalid correlation values results in throughput deterioration in the initial fractional frequency offset estimation.

Figure 6:
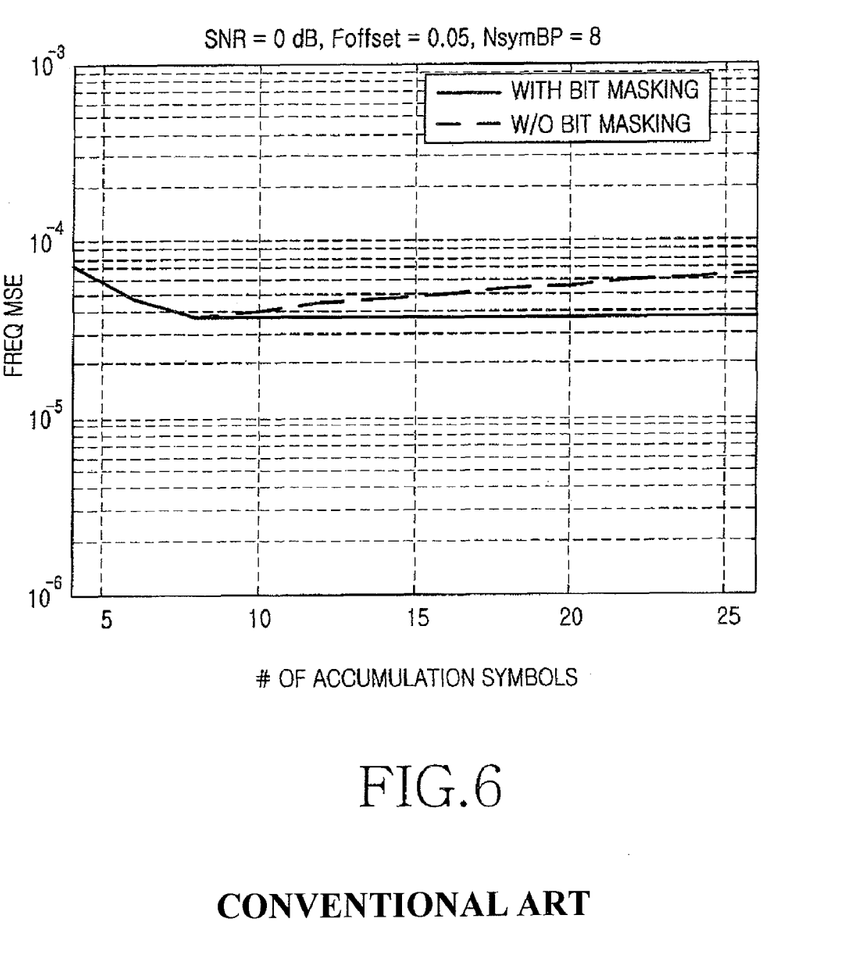
FIG. 6 is a graph illustrating a simulation result showing throughput deterioration with respect to the number of valid symbols.

FIG. 6 is a graph illustrating a simulation result showing throughput deterioration with respect to the number of valid symbols. The greater the number of DL symbols not having data, the greater the throughput deterioration.

Accordingly, there is a need for an apparatus and method capable of determining whether to apply beam forming and then determining valid symbols having data in order to prevent throughput deterioration of a frequency offset estimation.

SUMMARY OF THE INVENTION

An aspect of the present invention is to address at least the above-mentioned problems and/or disadvantages and to provide at least the advantages described below. Accordingly, an aspect of the present invention is to provide an apparatus and method for initial fractional frequency offset estimation in a Broadband Wireless Access (BWA) communication system.

Another aspect of the present invention is to provide an apparatus and method for initial fractional frequency offset estimation to reduce throughput deterioration of a frequency offset estimation in a BWA communication system.

Another aspect of the present invention is to provide an apparatus and method, in which a symbol power calculator and a comparator are additionally provided in a process of estimating an initial fractional frequency offset, an average power of a DownLink (DL)-MAP symbol is calculated by the symbol power calculator, and the calculated average power of the DownLink (DL)-MAP symbol is used to determine whether to apply beam forming to symbols received after the DL-MAP symbol, in a BWA communication system.

Another aspect of the present invention is to provide an apparatus and method for improving throughput of an initial fractional frequency offset estimation and also for improving the accuracy and reliability of an entire synchronization system in such a manner that the average power of symbols are compared to obtain information indicating whether to apply beam forming, this information is used to determine a presence or absence of DL-symbol data, and the determination result is used for overall correlation accumulation control in a BWA communication system.

According to an aspect of the present invention, an apparatus for estimating an initial fractional frequency offset in a BWA communication system is provided. The apparatus includes a sample power calculator for calculating a power of input sample data and for calculating an average power of a specific symbol, a power threshold comparator for comparing the sample data power in magnitude with the average power of the specific symbol and for outputting one of an accumulation ON and OFF signal, a first buffer for correlating a last data of the sample data with the sample data and for storing sample data corresponding to a preset number of correlation results, a second buffer for storing sample data corresponding to correlation results other than the sample data stored in the first buffer; and an accumulator for allowing accumulation of sample data stored in the second buffer if the power threshold comparator outputs the accumulation ON signal.

According to another aspect of the present invention, a method of estimating an initial fractional frequency offset in a BWA communication system is provided. The method includes receiving sample data or a specific symbol, and if the sample data is received, calculating a power of the sample data, and if the specific data is receive, calculating an average power of the specific sample, correlating a last data of the sample data with the sample data and storing in a first buffer sample data corresponding to a preset number of correlation results, storing in a second buffer sample data corresponding to correlation results other than the correlation results stored in the first buffer, and comparing the sample data power in magnitude with an average power of the specific symbol, and if the sample data is greater in magnitude than the average power of the specific symbol, accumulating in a third buffer the sample data stored in the second buffer.

According to another aspect of the present invention, a system for estimating an initial fractional frequency offset in a BWA communication system is provided. The system includes a first communications device for transmitting at least one of sample data and a specific symbol by using a beam forming technique, and a second communications device, wherein power is calculated for the sample data and average power is calculated for the specific sample upon receiving the sample data or the specific symbol, the sample data power is compared in magnitude with the average power of the specific symbol to determine whether to enable or disable accumulation, a last data of the sample data is correlated with the sample data and sample data corresponding to a preset number of correlation results are stored in a first buffer, sample data corresponding to correlation results other than the sample data stored in the first buffer are stored in a second buffer, and the sample data stored in the second buffer is accumulated in a third buffer when accumulation is enabled.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an apparatus and method for initial fractional frequency offset estimation in a Broadband Wireless Access (BWA) communication system will be described.

Figure 2:
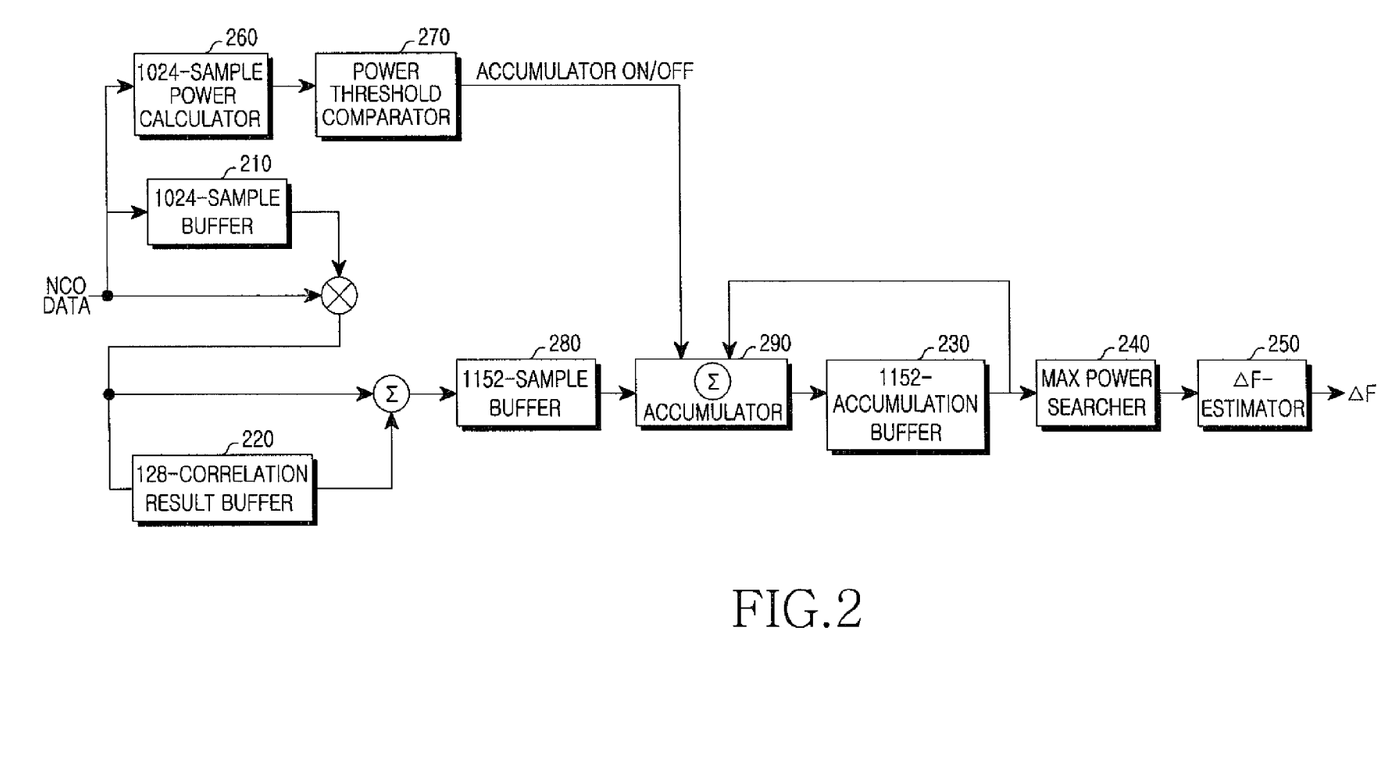
FIG. 2 is a block diagram illustrating an apparatus for estimating an initial fractional frequency offset according to an exemplary embodiment of the present invention.

FIG. 2 is a block diagram illustrating an apparatus for estimating an initial fractional frequency offset according to an exemplary embodiment of the present invention. In FIG. 2, each symbol is assumed to include 1152 samples among which 128 samples are Cyclic Prefixes (CP).

In addition to the elements of the conventional apparatus of FIG. 1, the apparatus of an exemplary embodiment of the present invention further includes a 1024-sample power calculator 260, a power threshold comparator 270, a 1152-sample buffer 280, and an accumulator 290. Functions of other elements not shown in FIG. 2 are identical to those of the conventional apparatus. The 1024-sample buffer 210, 128-correlation result buffer 220, 1152-accumulation buffer 230, max power searcher 240 and Δf-estimator 250 correspond to the 1024-sample buffer 110, 128-correlation result buffer 120, 1152-accumulation buffer 130, max power searcher 140 and Δf-estimator 150 shown in FIG. 1.

The 1024-sample buffer 210 stores 1024 input data samples included in an input signal.

The 1024-sample power calculator 260 calculates the power of the 1024 input data samples for each symbol. Further, the 1024-sample power calculator 260 calculates an average power for a DL-MAP symbol.

The power threshold comparator 270 compares the power of a symbol received after a DL-MAP symbol with the average power of the DL-MAP symbol. A symbol having less power than the average power of the DL-MAP symbol is determined to be a symbol to which beam forming for another user terminal is applied.

Beam forming information is used to determine the presence or absence of data in a symbol received after the DL-MAP symbol, and the result of the determination is used to determine whether to enable or disable the accumulation of correlation values. A 128-correlation result buffer 220 stores 128 results obtained by correlating the $1024^{th}$ data of the 1024-sample buffer 210 with the input data samples.

For all 1152 samples, the 1152-sample buffer 280 stores accumulation results by accumulating a new correlation value while not accumulating the 128 data samples of the 128-correlation result buffer 220.

When the power threshold comparator 270 enables correlation value accumulation for a symbol received after a DL- MAP symbol, the accumulator 290 accumulates the correlation value of the 1152-sample buffer 280 in a 1152-accumulation buffer 230.

The 1152-accumulation buffer 230 stores the correlation value of the 1152-sample buffer 280.

When the 1152-accumulation buffer 230 finishes the accumulation, a max power searcher 240 finds a location of a sample having the greatest value among the 1152 accumulated correlation values.

A Δf-estimator 250 finds a fractional frequency offset by using an accumulated correlation value of a sample having a maximum power.

Figure 4:
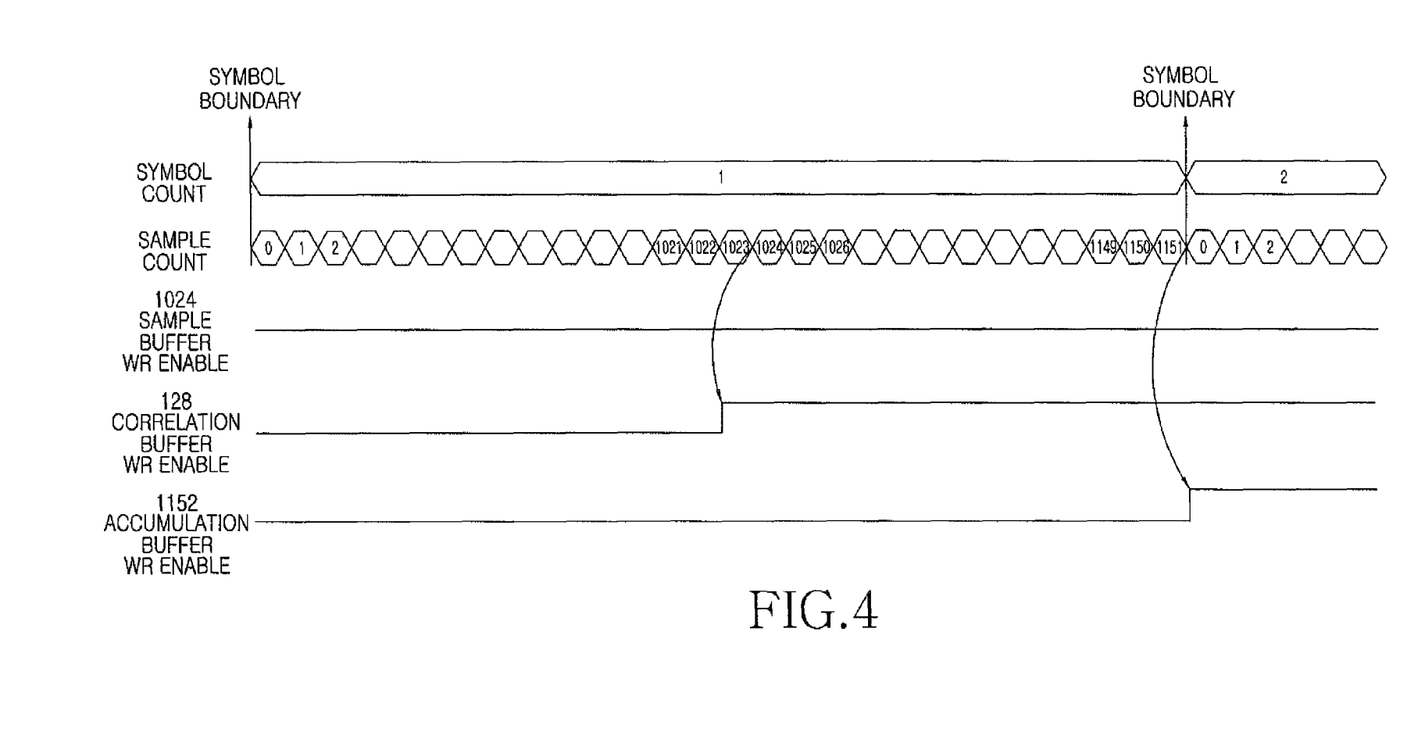
FIG. 4 is a timing diagram of an initial fractional frequency offset estimation in a sample unit.

FIG. 4 illustrates a timing diagram of an initial fractional frequency offset estimation in a sample unit; and FIG. 5 shows continuous accumulation after the activation of an enable signal.

According to an exemplary embodiment of the present invention, unlike FIG. 5 which represents continuous accumulation, since the 1152-accumulation buffer 230 accumulates data differently according to whether beam forming is applied or not, it is possible to distinguish a symbol having data from a symbol not having data. Therefore, throughput of an initial fractional frequency offset estimation can be improved, and also accuracy and reliability in an entire synchronization system can be improved.

Figure 3:
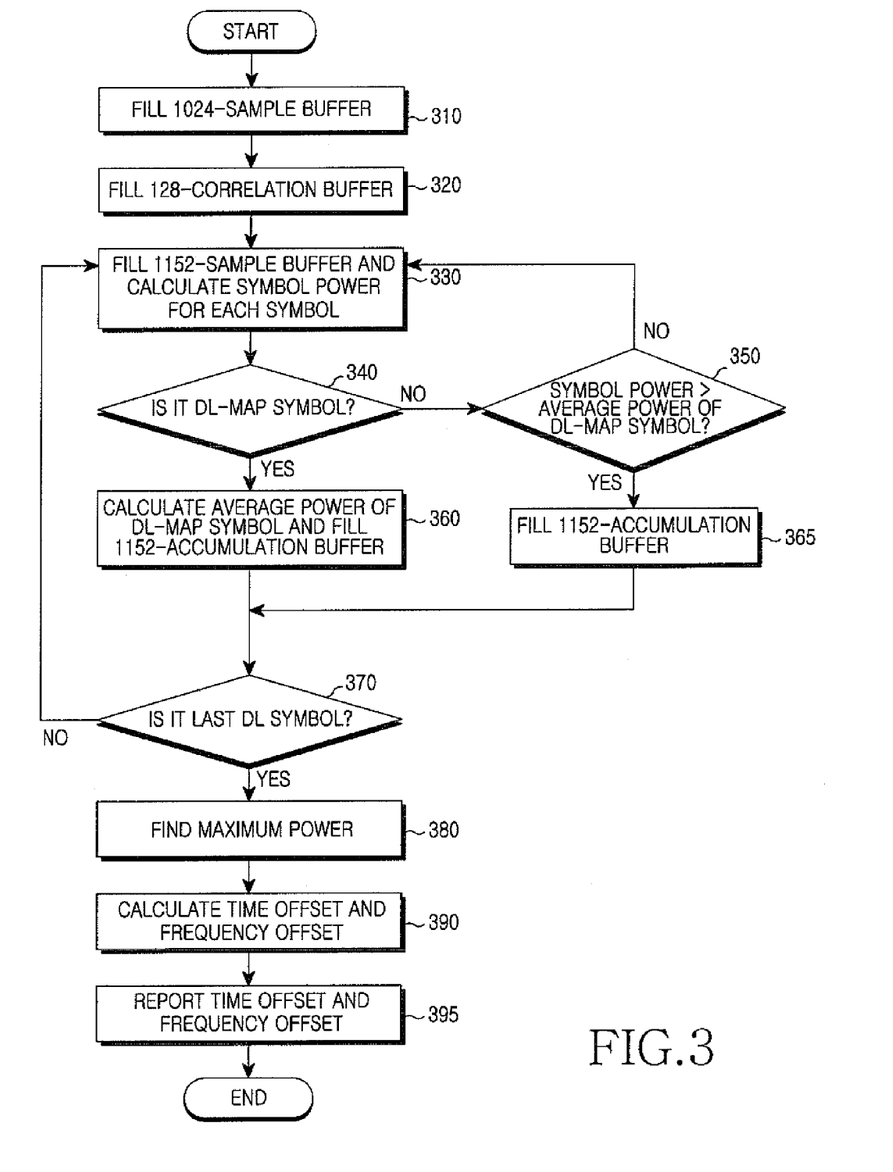
FIG. 3 is a flowchart illustrating an operation of an apparatus for estimating an initial fractional frequency offset according to an exemplary embodiment of the present invention.

FIG. 3 is a flowchart illustrating an operation of an apparatus for estimating an initial fractional frequency offset according to an exemplary embodiment of the present invention. In the operation of FIG. 3, one symbol is assumed to include 1152 samples among which 128 samples are Cyclic Prefixes (CP).

First, values of all buffers are initialized, and 1024 input data samples are stored (step 310). Thereafter, 128 results are stored which are obtained by correlating the 1024 data samples of the 1024-sample buffer with the input data samples (step 320).

Next, a correlation value that is obtained for each symbol period is stored in a 1152-sample buffer, and the power of the symbol is measured (step 330). The 1152-sample buffer is sized to buffer 1152 samples which corresponds to the number of samples included in one OFDM symbol Next, it is determined whether the symbol is a DL-MAP symbol (step 340). If it is not a DL-MAP symbol, the average power of the DL-MAP symbol is used as a reference value for determining whether beam forming is applied to symbols received after the DL-MAP symbol. This is because a DL-MAP symbol has a normal power level.

If the symbol has less power than the average power of the DL-MAP symbol (step 350), it is determined that the symbol does not contain valid data because beam forming for another user terminal is applied. Accumulation of a correlation value is not performed on this symbol, and the procedure proceeds to 330 to calculate power of a next symbol.

If the symbol has greater power than the average power of the DL-MAP symbol (step 350), the symbol is determined to be a symbol having valid data, and a correlation value of the symbol is accumulated in a 1152 accumulation buffer (step 365). Then, the procedure proceeds to step 370.

Meanwhile, if it is determined that the symbol is a DL-MAP symbol (step 340), the average power of the DL-MAP symbol is calculated, and a correlation value of the symbol is accumulated in the 1152 accumulation buffer (step 360). Then, the procedure proceeds to step 370.

If the symbol is not a last valid DownLink DL symbol (step 370), step 330 and its subsequent steps are repeated for the next symbol.

Otherwise, if the symbol is the last valid DL symbol (step 370), a location of a sample having the greatest value among the 1152 accumulated correlation values is found (step 380).

A frequency offset is estimated by using the correlation value having the greatest value (i.e., greatest power) (step 390). Thereafter, estimated values are delivered to an NCO (step 395). Then, the procedure of FIG. 3 ends.

Figure 7:
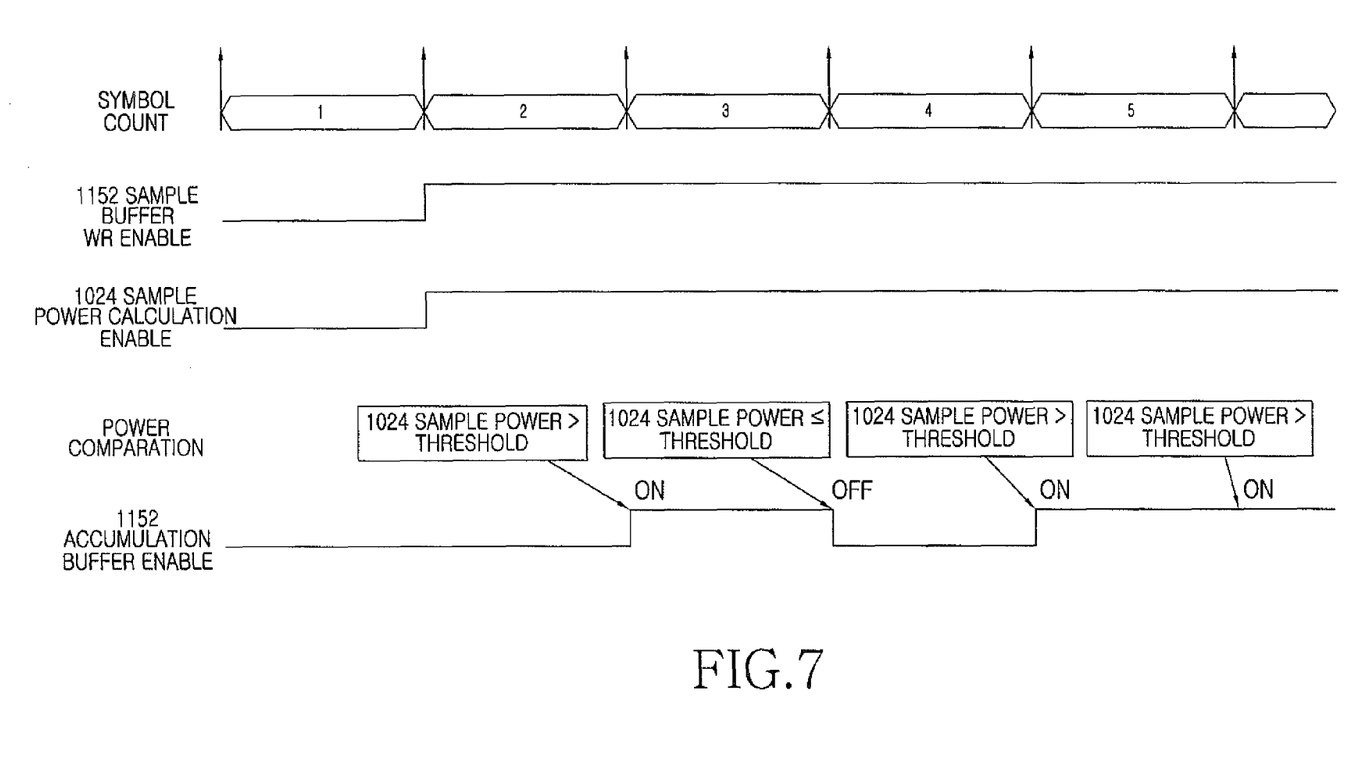
FIG. 7 is a timing diagram of initial fractional frequency offset estimation according to an exemplary embodiment of the present invention.

FIG. 7 illustrates a timing diagram of an initial fractional frequency offset estimation according to an exemplary embodiment of the present invention. If power of the 1024 samples is larger than a threshold, the 1152 accumulation buffer can accumulate a correlation value.

According to an exemplary embodiment of the present invention, it is determined whether to apply beam forming to symbols received after a DL-MAP, and the result of the determination is used to determine the presence or absence of DL symbol data and is used for overall correlation accumulation control. Thus, it is possible to distinguish a symbol having data from a symbol not having data. Therefore, throughput of initial fractional frequency offset estimation can be improved. Also accuracy and reliability in an entire synchronization system can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for estimating an initial fractional frequency offset in a Broadband Wireless Access (BWA) communication system, the apparatus comprising:
    a sample power calculator for calculating a power of input sample data and for calculating an average power of a specific symbol;
    a power threshold comparator for comparing the sample data power in magnitude with the average power of specific symbol and for outputting one of an accumulation ON and OFF signal;
    a first buffer for correlating a last data of the sample data with the sample data and for storing sample data corresponding to a preset number of correlation results;
    a second buffer for storing sample data corresponding to correlation results other than the sample data stored in the first buffer; and
    an accumulator for allowing accumulation of sample data stored in the second buffer if the power threshold comparator outputs the accumulation ON signal.

2. The apparatus of claim 1, further comprising:
    a third buffer for accumulating the sample data of the second buffer if the accumulator allows accumulation;
    a maximum power searcher for searching for sample data having a greatest power by calculating a power of the sample data accumulated in the third buffer; and
    an offset measurer for obtaining a fractional frequency offset by using an accumulated correlation value of the sample data having the greatest power found by the maximum power searcher.

3. The apparatus of claim 2, wherein the specific symbol comprises a DownLink (DL)-MAP symbol.

4. The apparatus of claim 2, wherein, if the sample data power is greater in magnitude than the average power of the specific symbol, the power threshold comparator outputs the accumulation ON signal.

5. The apparatus of claim 2, wherein, if the sample data power is less in magnitude than the average power of the specific symbol, the power threshold comparator outputs the accumulation OFF signal.

6. The apparatus of claim 2, wherein, if the power threshold comparator outputs the accumulation OFF signal, the accumulator does not allow accumulation for the sample data of the second buffer.

7. The apparatus of claim 2, wherein, if the accumulator does not allow accumulation, the third buffer does not accumulate the sample data of the second buffer.

8. A method of estimating an initial fractional frequency offset in a Broadband Wireless Access (BWA) communication system, the method comprising:
receiving sample data or a specific symbol, and if the sample data is received, calculating a power of the sample data, and if the specific data is received, calculating an average power of the specific sample;
correlating a last data of the sample data with the sample data and storing in a first buffer sample data corresponding to a preset number of correlation results;
storing in a second buffer sample data corresponding to correlation results other than the correlation results stored in the first buffer; and
comparing the sample data power in magnitude with an average power of a specific sample, and if the sample data is greater in magnitude than the average power of the specific symbol, accumulating in a third buffer the sample data stored in the second buffer.

9. The method of claim 8, further comprising:
searching for sample data having a greatest power by calculating a power of the sample data accumulated in the third buffer; and
obtaining a fractional frequency offset by using an accumulated correlation value of the sample data having the greatest power.

10. The method of claim 9, further comprising comparing a magnitude of the power of the sample data with the average power of the specific symbol, and if the magnitude of the power of the sample data power is less than the average power of the specific symbol, not accumulating in the third buffer the sample data stored in the second buffer.

11. The method of claim 9, wherein the specific symbol comprises a DownLink (DL)-MAP symbol.

12. A system for estimating an initial fractional frequency offset in a Broadband Wireless Access (BWA) communication system, the system comprising:
a first communications device for transmitting at least one of sample data and a specific symbol by using a beam forming technique; and
a second communications device, wherein power is calculated for the sample data and average power is calculated for a specific sample upon receiving the sample data or the specific symbol, the sample data power is compared in magnitude with the average power of the specific symbol to determine whether to enable or disable accumulation, a last data of the sample data is correlated with the sample data and sample data corresponding to a preset number of correlation results are stored in a first buffer, sample data corresponding to correlation results other than the sample data stored in the first buffer are stored in a second buffer, and the sample data stored in the second buffer is accumulated in a third buffer when accumulation is enabled.

13. The system of claim 12, wherein the second communications device searches for sample data having a greatest power by calculating a power of the sample data accumulated in the third buffer and obtains a fractional frequency offset by using an accumulated correlation value of the sample data having the greatest power.

14. The system of claim 13, wherein the second communications device does not accumulate in the third buffer the data sample stored in the second buffer if accumulation is disabled.

15. The system of claim 13, wherein the specific symbol comprises a DownLink (DL)-MAP symbol.

* * * * *